United States Patent [19]

Chen

[11] Patent Number: 5,301,454
[45] Date of Patent: Apr. 12, 1994

[54] FISHING HOOK HOLDER

[76] Inventor: Kuang-Sheng Chen, No. 33, Chung Hsing Rd., Mei Nung Chen, Kaohsiung Hsien, Taiwan

[21] Appl. No.: 6,051

[22] Filed: Jan. 19, 1993

[51] Int. Cl.$^5$ ............................................. A01K 91/04
[52] U.S. Cl. ................................. 43/42.74; 43/44.83; 43/44.84; 24/663; 24/573.1
[58] Field of Search ............... 43/42.74, 44.83, 44.84, 43/44.85; 24/669, 663, 702, 597, 593, 590, 573.1

[56] References Cited

U.S. PATENT DOCUMENTS

| | | | |
|---|---|---|---|
| 289,612 | 12/1883 | Bollermann | 43/44.84 |
| 473,503 | 4/1892 | Herring | 43/44.85 |
| 1,347,515 | 7/1920 | Lutz | 24/663 |
| 1,840,762 | 1/1932 | Akervick | 43/42.74 |
| 2,465,064 | 3/1949 | Colosimo | 43/44.83 |
| 2,545,326 | 3/1951 | Westfall | 43/42.74 |
| 2,552,248 | 5/1951 | Zavod | 43/44.83 |
| 3,426,468 | 2/1969 | Hinkson | 43/42.74 |
| 3,449,854 | 6/1969 | Sinclair | 43/44.84 |
| 3,650,063 | 3/1972 | Pierce | 43/42.74 |
| 4,023,302 | 5/1977 | Hoaglin | 43/42.74 |

FOREIGN PATENT DOCUMENTS 1366927 6/1964 France ..................... 43/44.83

Primary Examiner—Kurt Rowan
Attorney, Agent, or Firm—Hopkins & Thomas

[57] ABSTRACT

A fishing hook holder unit includes a holder body having a first end, a second end, and a neck portion between the first and second ends. A first engaging member is removably mounted to the first end of the holder body for engaging a fishing line from one of a fishing rod and another fishing hook holder unit. A second engaging member is removably mounted to the second end for engaging a fishing line from one of another fishing hook holder unit and a sinker. The holder unit further includes a hook-attaching member which has an engaging portion for securely engaging with the neck portion of the holder body, a mounting portion pivoted to the engaging portion, and a third engaging member removably mounted to the mounting portion for engaging with a fishing line from a hook.

1 Claim, 4 Drawing Sheets

FISHING HOOK HOLDER

BACKGROUND OF THE INVENTION

The present invention relates to a fishing hook holder and, more particularly, to a fishing hook holder having a removable hook-holding member.

During fishing, the fisher usually has to change the hooks and/or baits responsive to different schools of fishes, climate, tide, and other factors. The fisher, however, has to cut the fishing line connecting the hook and the hook holder and replace it with a desired hook. The present invention provides an improved hook holder to mitigate and/or obviate the above-mentioned drawback.

SUMMARY OF THE INVENTION

In accordance with one aspect of the present invention, a fishing hook holder includes a tubular body and two engaging means. The tubular body has a first end and a second end each with a substantially L-shaped cutout which extends longitudinally inward from a periphery thereof. The L-shaped cutout comprises a longitudinal portion and a radial portion. A flexible member extends in the longitudinal portion to block the radial portion at an unbiased status.

The engaging means includes a tubular member and a ring rotationally mounted in the tubular member. A member projects outward and radially from an outer periphery of the tubular member. The member is guided by the flexible member along the longitudinal portion into the radial portion of the L-shaped cutout. The distal end of the flexible member blocks the radial portion and thus prevents disengagement of the engaging members and the tubular body. The main fishing line from a fishing rod is bound to the upper ring and the hook line from a hook means is bound to the lower ring. The lower engaging means may be removed from the tubular body by simply biasing the flexible member to expose an exit for the member.

In accordance with another aspect of the present invention, there is provided a fishing hook holder unit which includes a holder body having a first end, a second end, and a neck portion between the first and second ends. A first engaging means is removably mounted to the first end of the holder body for engaging a fishing line from one of a fishing rod and another fishing hook holder unit. A second engaging means is removably mounted to the second end for engaging a fishing line from one of another fishing hook holder unit and a sinker. The fishing hook holder unit further includes a hook-attaching means comprising an engaging portion for securely engaging with the neck portion of the holder body, a mounting portion pivoted to the engaging portion, and a third engaging means removably attached to the mounting portion for engaging with a fishing line from a hook means.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
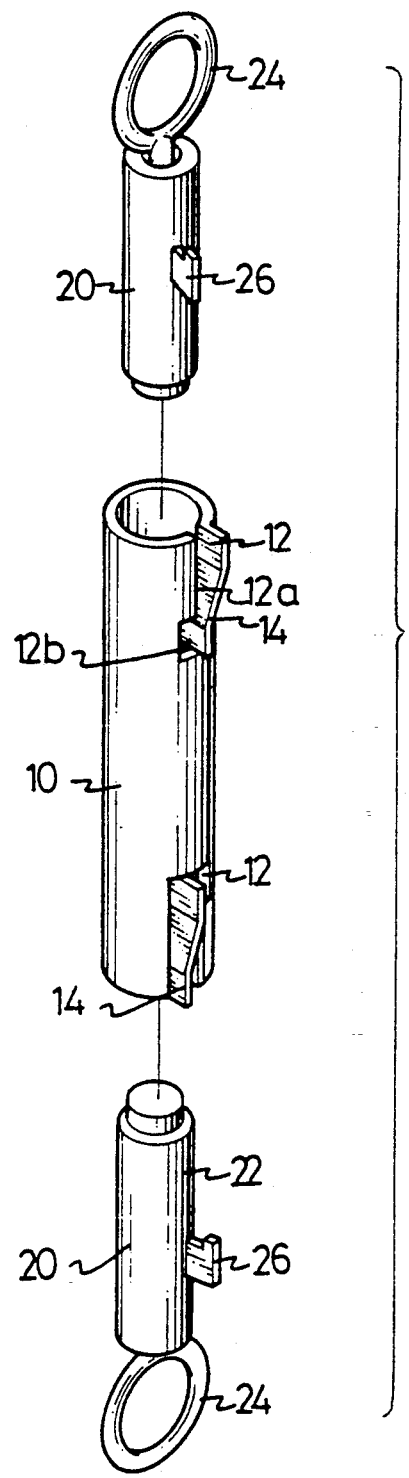
FIG. 1 is an exploded view of a fishing hook holder in accordance with the present invention.
Figure 2:
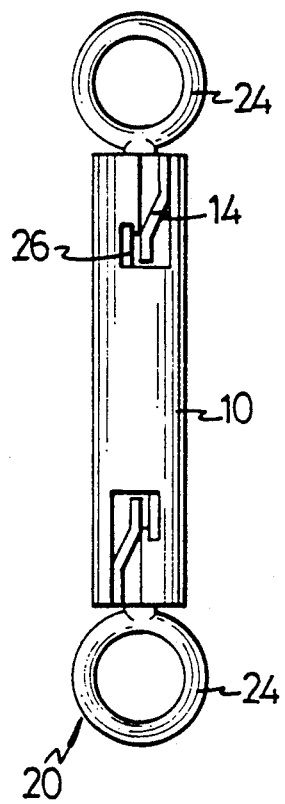
FIG. 2 is a side elevational view of the fishing hook holder in accordance with the present invention.

Referring to FIGS. 1 and 2, a fishing hook holder in accordance with the present invention generally includes a tubular body 10 and two engaging means 20. The tubular body 10 has a first end and a second end each with a substantially L-shaped cutout 12 which extends longitudinally inward from a periphery thereof. The L-shaped cutout 12 comprises a longitudinal portion 12a and a radial portion 12b. A flexible member 14 extends in the longitudinal portion 12a to block the radial portion 12b at an unbiased status.

Figure 3:
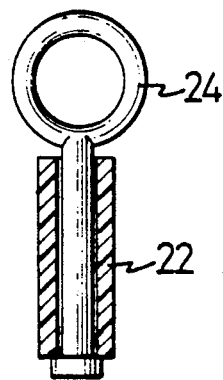
FIG. 3 is a cross-sectional view illustrating the detailed structure of the removable engaging member.

Still referring to FIGS. 1 and 2, and further to FIG. 3, the engaging means 20 includes a tubular member 22 and a ring 24 rotationally mounted in the tubular member 22. A member 26 projects outward and radially from an outer periphery of the tubular member 22. The member 26 is guided by the flexible member 14 along the longitudinal portion 12a into the radial portion 12b of the L-shaped cutout 12. The distal end of the flexible member 14 blocks the radial portion 12b and thus prevents disengagement of the engaging members 20 and the tubular body 10. The main fishing line from a fishing rod is bound to the upper ring 24 and the hook line from a hook means is bound to the lower ring 24. The lower engaging means 20 may be removed from the tubular body 10 by simply biasing the flexible member 26 to expose an exit for the member 26.

Figure 4:
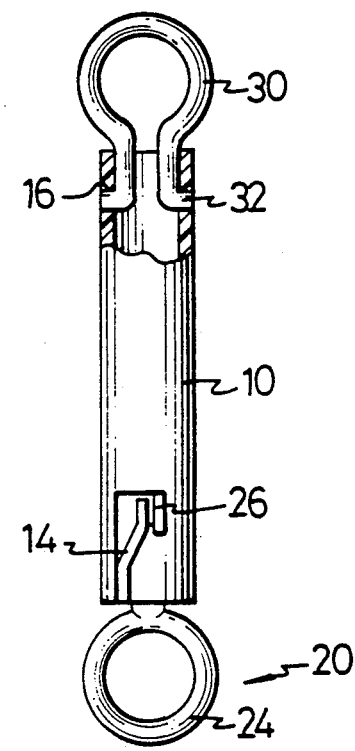
FIG. 4 is a side elevational view, partly cross-sectioned, of an alternative embodiment of the fishing hook holder in accordance with the present invention.

FIG. 4 shows an alternative embodiment of the fishing hook holder in which the upper engaging means is simply a C-clamp 30 with two legs 32 thereof removably engaged in two holes 16 in an upper portion of the tubular body 10.

Figure 5:
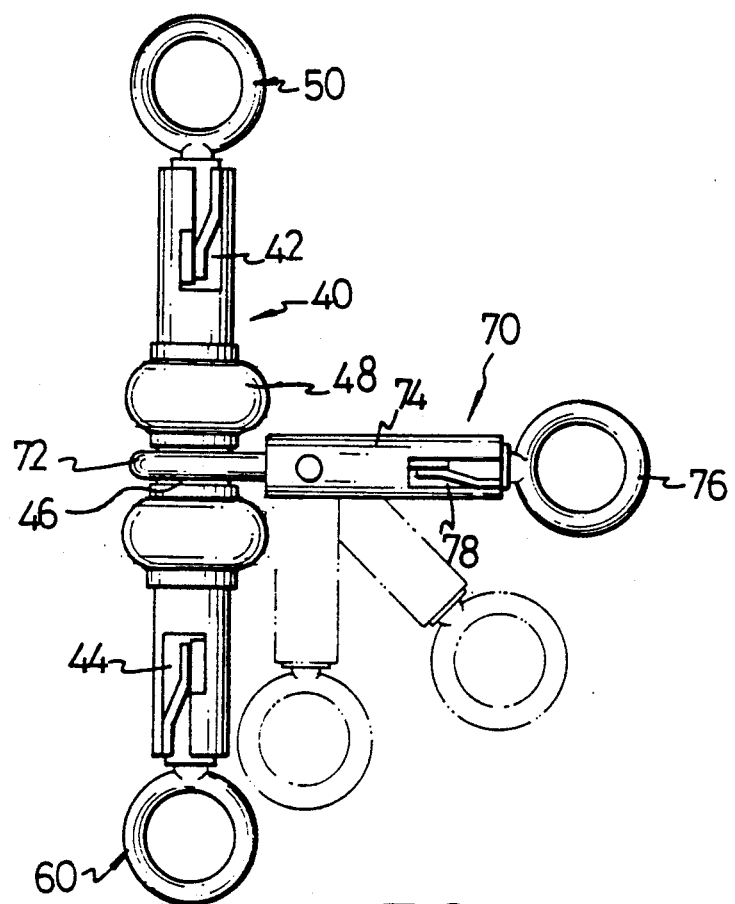
FIG. 5 is a side elevational view of another embodiment of a fishing hook holder unit in accordance with the present invention.
Figure 6:
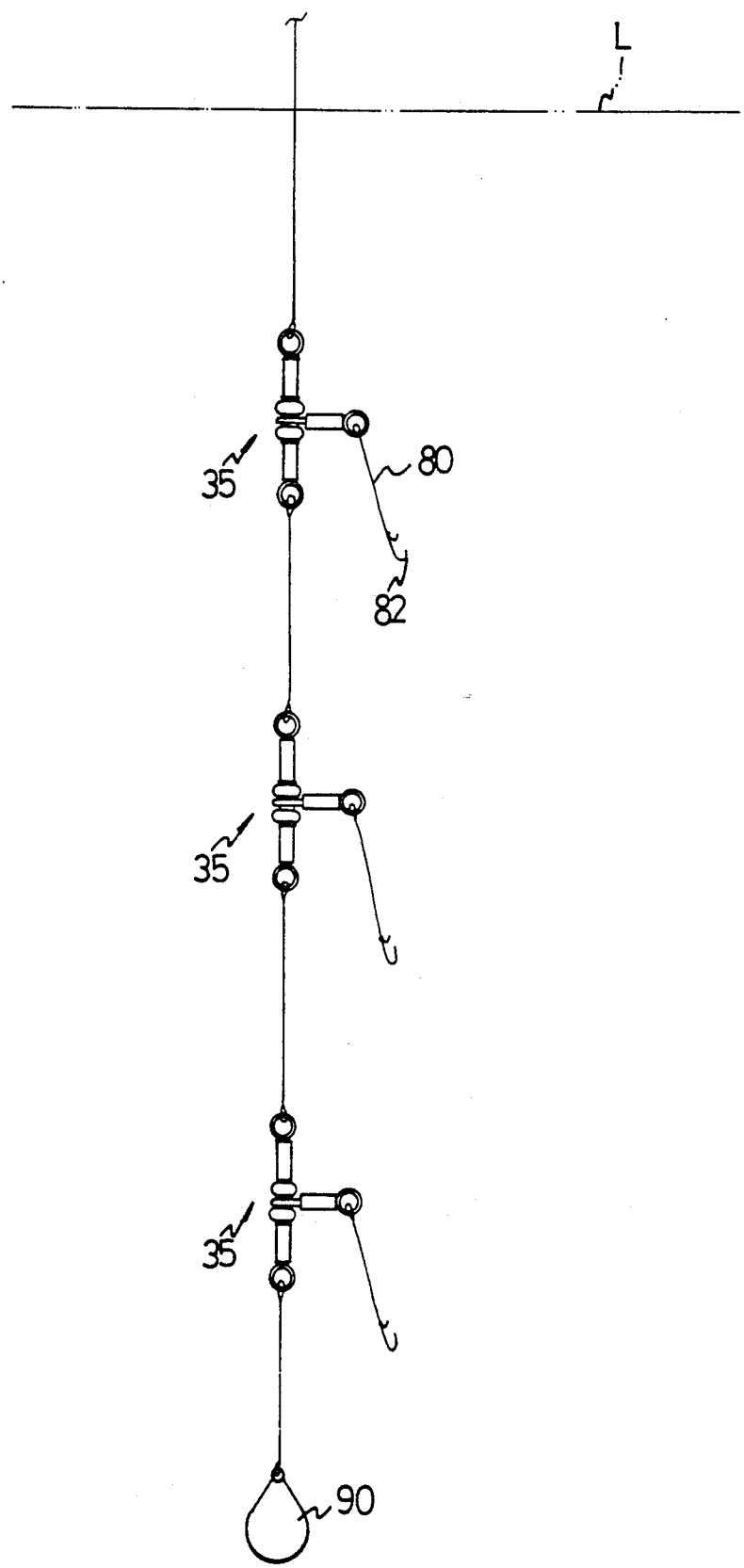
FIG. 6 is a schematic view showing an application of the fishing hook holder unit in accordance with the present invention.

Referring now to FIGS. 5 and 6 in which a fishing hook holder unit is shown. The fishing hook holder unit 35 includes a holder body 40 which has a first end with a L-shaped cutout 42, a second end with a second L-shaped cutout 44, and a neck portion 46 between the first and second ends. A first engaging means 50 is removably mounted to the first end of the holder body 40 for engaging a fishing line from a fishing rod or another fishing hook holder unit (see FIG. 6). A second engaging means 60 is removably mounted to the second end of the holder body 40 for engaging a fishing line from another fishing hook holder unit or a sinker 90. In FIG. 6, the line L indicates the water level.

Figure 7:
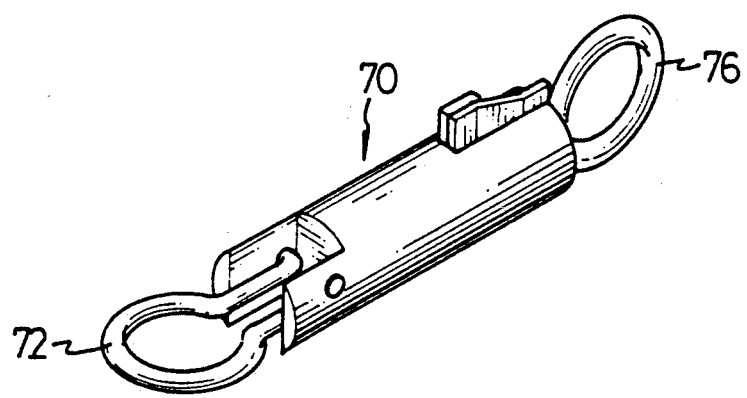
FIG. 7 is a perspective view illustrating a means for engaging with a hook means.

Still referring to FIG. 5, and further to FIG. 7, the fishing hook holder unit further has a hook-attaching means 70 which includes an engaging C-clamp 72 for securely engaging with the neck portion 46 of the holder body 40, a mounting portion 74 pivoted to two legs of the engaging C-clamp 72, and a third engaging means 76 mounted to the mounting portion 74 for engaging with a fishing line 80 from a hook means 82 (see FIG. 6). A third L-shaped cutout 78 is formed in the mounting portion 74 for removably engaging with the third engaging means 76. Preferably, two rubber rings 48 are provided on both sides of the neck portion 46 for reducing impact when a fish bites the bait on the hook means 82 which results in a pivotal motion of the third means 70 (see phantom lines in FIG. 5). The structure of the L-shaped cutouts 42, 44, and 78 is the same as the cutout 12 in the first embodiment illustrated in the above. Similarly, the structure of the first, second, and third engaging means 50, 60, and 76 is the same as the engaging means 20 illustrated in the above.

Although the invention has been explained in relation to its preferred embodiment, it is to be understood that many other possible modifications and variations can be made without departing from the spirit and scope of the invention as hereinafter claimed.

I claim:

1. A fishing hook holder comprising:

a tubular body having a first end and a second end each with a substantially L-shaped cutout which extends longitudinally inward from a periphery thereof, said L-shaped cutout comprising a longitudinal portion and a radial portion, a flexible member extending in said longitudinal portion to block said radial portion at an unbiased status thereof;

a first engaging means comprising a tubular member and a first ring rotationally mounted to said tubular member for engaging with a hook means, a member projecting outward and radially from an outer periphery of said tubular member, said member being removably received in said radial portion of said L-shaped cutout in said first end to prevent disengagement of said first engaging member and said tubular body; and a second engaging means comprising a second tubular member and a second ring rotationally mounted to said tubular member for engaging with a main fishing line from a fishing rod, a second member projecting outward and radially from an outer periphery of said second tubular member, said second member being removably received in said radial portion of said L-shaped cutout in said second end to prevent disengagement of said second engaging member and said second tubular body.

* * * * *